J. W. OLSON.
WIRE FENCE TIGHTENER AND POST ANCHOR.
APPLICATION FILED NOV. 8, 1915.
1,213,125. Patented Jan. 16, 1917.
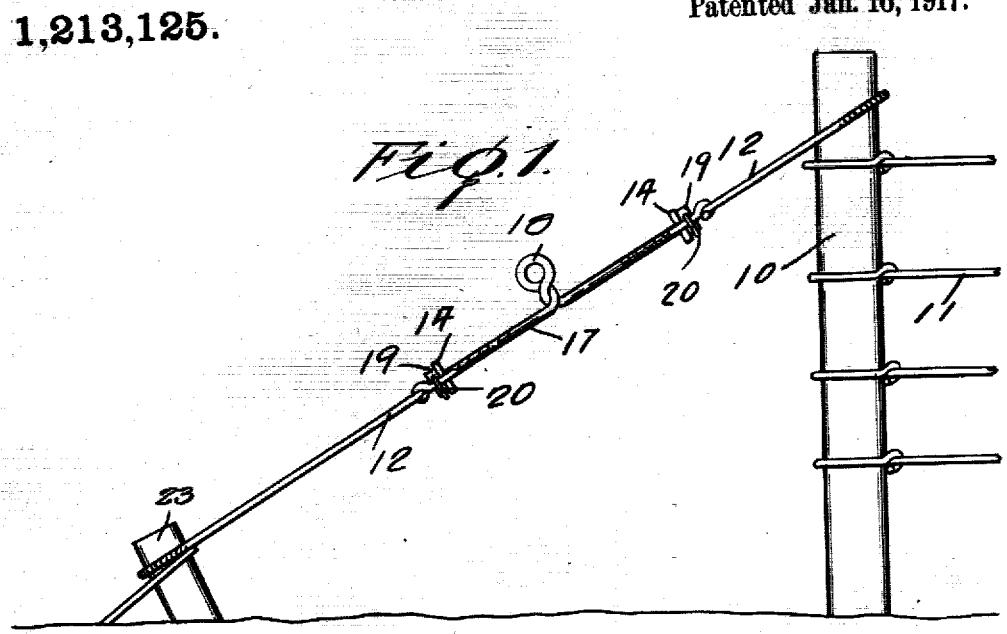
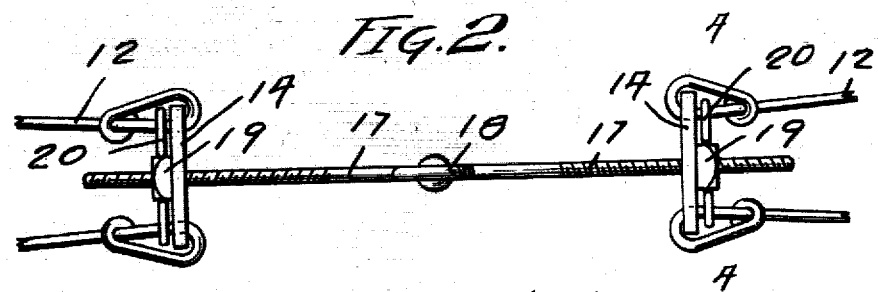
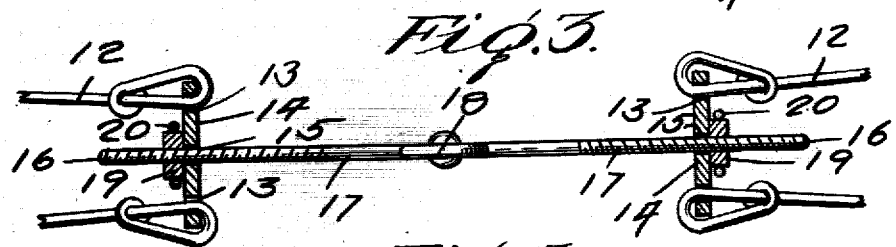
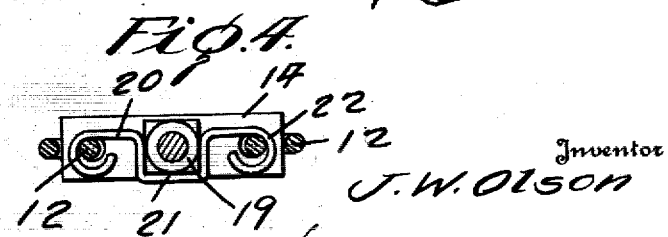
Inventor
J. W. Olson

UNITED STATES PATENT OFFICE.

JOSEPH W. OLSON, OF MINNEWAUKAN, NORTH DAKOTA.

WIRE-FENCE TIGHTENER AND POST-ANCHOR.

1,213,125.  Specification of Letters Patent.  Patented Jan. 16, 1917.

Application filed November 8, 1915. Serial No. 60,360.

*To all whom it may concern:*

Be it known that I, JOSEPH W. OLSON, a citizen of the United States, residing at Minnewaukan, in the county of Benson, State of North Dakota, have invented certain new and useful Improvements in Wire-Fence Tighteners and Post-Anchors; and I do hereby declare the following to be a full, clear, and exact description of the invention, such as will enable others skilled in the art to which it appertains to make and use the same.

This invention relates to improvements in wire fence tighteners and post anchors.

The principal object of the invention is to provide a novel and simple device of this character, which will effectively brace a fence post while at the same time draw the post in such position that the fence wires will be properly stretched.

Another object is to provide a device of this character which is simple and cheap in construction and which can be readily applied to the ordinary fence post of a wire fence without modifications to the post or fence.

Other objects and advantages will be apparent from the following description when taken in connection with the accompanying drawing.

In the drawing: Figure 1 is an elevation of my device in use; Fig. 2 is an enlarged plan view of the device; Fig. 3 is an enlarged horizontal longitudinal sectional view; and Fig. 4 is a transverse sectional view on the line 4—4 of Fig. 2.

Referring particularly to the accompanying drawing, 10 represents a fence post and 11 the fence wires thereof, and in connection with which my invention is particularly adapted for use.

The device includes a pair of wire cables 12 formed into loops and having their ends engaged through openings 13 in plates 14, these ends being then brought around the ends of the plates and properly spliced to the remaining portions of the cables. Each of the plates 14 has a central opening 15 through which extends the threaded end 16 of a bar 17. The intermediate portion of this bar is twisted to form a loop 18 for the reception of a bar or other suitable tool whereby the bar can be turned as will be readily understood. Engaged on the threaded portions of the bar, outwardly of the plates are nuts 19 which, when the bar is to be turned, are held against turning movement by the wrench devices 20. Each of these devices includes a central angular socket portion 21 which receives the nut and the oppositely disposed loop portions 22 which engage with the adjacent ends of the loop.

In the operation of the device, one of the loops 12 is engaged around the upper portion of the post 10 while the other loop is engaged around a stake 23 driven in the ground at a suitable distance from the post. A bar is then inserted through the loop 18, after having properly placed the wrench devices 20, and then moved to rotate the bar 17 which results in the threaded portion passing through the nuts 19 and bearing on the plates 20 so as to draw the loops toward each other and thus exert pull on the post to tighten the line wires of the fence.

What is claimed is:

1. A fence wire tightener and post anchor comprising a pair of wire loops, apertured plates carried by the loops, an oppositely threaded bar slidably engaged through the plates and provided with adjusting nuts, and an intermediate loop member carried by the bar for engagement of a tool to turn the bar, and means engaging with the said wire loops and with the said nuts to hold the nuts against rotation relatively to said plates.

2. A tightening device comprising a pair of wire loops, a pair of plates having apertures receiving said loops therethrough, and central openings, an oppositely threaded bar having its ends slidably engaged through the central apertures, nuts engaged on the said threaded ends outwardly of the plates, and wire members having their opposite ends coiled about the said loops and their central portions bent to partially embrace the said nuts to prevent movement of the latter relatively to the plates and the loops.

In testimony whereof, I affix my signature, in the presence of a witness.

JOSEPH W. OLSON.

Witness:
O. T. PUXSON.

Copies of this patent may be obtained for five cents each, by addressing the "Commissioner of Patents, Washington, D. C."